US009379909B2

(12) United States Patent
Lee et al.

(10) Patent No.: US 9,379,909 B2
(45) Date of Patent: Jun. 28, 2016

(54) METHOD AND SYSTEM FOR MANAGING ENTERPRISE-RELATED MOBILE CALLS

(75) Inventors: Dalsu Lee, Thornhill (CA); Richard George, Waterloo (CA); Brian Oliver, Fergus (CA)

(73) Assignee: BlackBerry Limited, Waterloo (CA)

( * ) Notice: Subject to any disclaimer, the term of this patent is extended or adjusted under 35 U.S.C. 154(b) by 1872 days.

(21) Appl. No.: 11/771,560

(22) Filed: Jun. 29, 2007

(65) Prior Publication Data

US 2009/0003316 A1   Jan. 1, 2009

(51) Int. Cl.

| H04M 3/42 | (2006.01) |
| H04M 7/00 | (2006.01) |
| H04W 4/00 | (2009.01) |
| H04W 4/02 | (2009.01) |
| H04L 12/54 | (2013.01) |
| H04L 29/06 | (2006.01) |

(52) U.S. Cl.
CPC ........ *H04L 12/5695* (2013.01); *H04L 12/5692* (2013.01); *H04L 65/1053* (2013.01); *H04L 65/1069* (2013.01); *H04M 3/42314* (2013.01); *H04M 7/006* (2013.01); *H04M 2203/1091* (2013.01)

(58) Field of Classification Search
CPC ............ H04Q 2213/1327; H04Q 2213/13384; H04L 65/1053; H04M 3/4234
See application file for complete search history.

(56) References Cited

U.S. PATENT DOCUMENTS

| 6,466,786 B1 * | 10/2002 | Wallenius ............. H04M 3/436 455/403 |
| 2002/0142755 A1 * | 10/2002 | Takahashi .............. H04M 1/66 455/411 |
| 2002/0191595 A1 * | 12/2002 | Mar ...................... H04W 84/10 370/352 |
| 2004/0008627 A1 * | 1/2004 | Garg et al. .................... 370/235 |
| 2005/0075109 A1 * | 4/2005 | Neyret et al. ................. 455/445 |
| 2006/0030357 A1 | 2/2006 | McConnell |
| 2007/0010266 A1 * | 1/2007 | Chaudhuri .................... 455/466 |

(Continued)

FOREIGN PATENT DOCUMENTS

| CA | 2436946 | 10/2002 |
| DE | 102005046381 | 4/2007 |
| WO | 96/22000 | 7/1996 |
| WO | 2007040620 | 4/2007 |

OTHER PUBLICATIONS

Office Action dated Apr. 18, 2011 for corresponding Canadian Patent Application No. 2,635,865.

(Continued)

Primary Examiner — Asad Nawaz
Assistant Examiner — Jason Harley
(74) Attorney, Agent, or Firm — Ridout & Maybee LLP

(57) ABSTRACT

Methods, systems, and mobile devices for managing mobile calls to or from an enterprise-associated mobile device. The system and mobile device are configured to ensure all calls over a public land mobile network are routed through an enterprise communications system. The mobile device is prevented from directly calling remote parties through the public land mobile network and the public land mobile network forwards all calls addressed to the mobile device to the enterprise communications system. The enterprise communication system responds to a request to connect the mobile device and the remote party by establishing a first call with the mobile device, establishing a second call with the remote party, and bridging the two calls to connect the mobile device to the remote party.

25 Claims, 10 Drawing Sheets

(56) References Cited

U.S. PATENT DOCUMENTS

| | | | |
|---|---|---|---|
| 2007/0091848 A1* | 4/2007 | Karia | H04L 29/06027 370/331 |
| 2007/0206569 A1* | 9/2007 | Silver et al. | 370/352 |
| 2007/0206735 A1* | 9/2007 | Silver et al. | 379/88.19 |
| 2010/0178906 A1* | 7/2010 | Kennedy | 455/417 |

OTHER PUBLICATIONS

Examination Report dated Jun. 27, 2014 for the corresponding European Patent Application No. 07111406.0.

Examination Report dated Jul. 23, 2010 for the corresponding European Patent Application No. 07111406.0.

Extended European Search Report dated Jan. 24, 2008.

* cited by examiner

METHOD AND SYSTEM FOR MANAGING ENTERPRISE-RELATED MOBILE CALLS

FIELD

The present application relates to managing calls to or from a mobile device and, in particular, managing calls to or from a mobile device associated with an enterprise.

BACKGROUND

It is becoming more common for enterprises to provide employees with mobile devices for use in connection with their employment. A mobile device enabled for wireless communication allows the employee to maintain contact with clients, customers, co-workers, etc. The ability to make and receive voice calls using a mobile device allows a user to maintain responsiveness despite being away from his or her desk telephone. If the mobile device is capable of sending and receiving e-mail wirelessly, the user is able to respond quickly to inquiries and address problems while away from his or her desktop computer. Accordingly the use of enterprise-related mobile devices has become commonplace.

Most mobile wireless devices are equipped for wireless voice communication over a Public Land Mobile Network (PLMN), e.g. cellular or PCS network. The use of the mobile device to make or receive wireless voice calls directly with remote parties prevents the enterprise from managing those calls or exercising any control over those calls. For example, certain usage restrictions that may apply to telephone use within the wired enterprise telephone network may not necessarily be applied to calls through the PLMN from the enterprise-related mobile devices.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
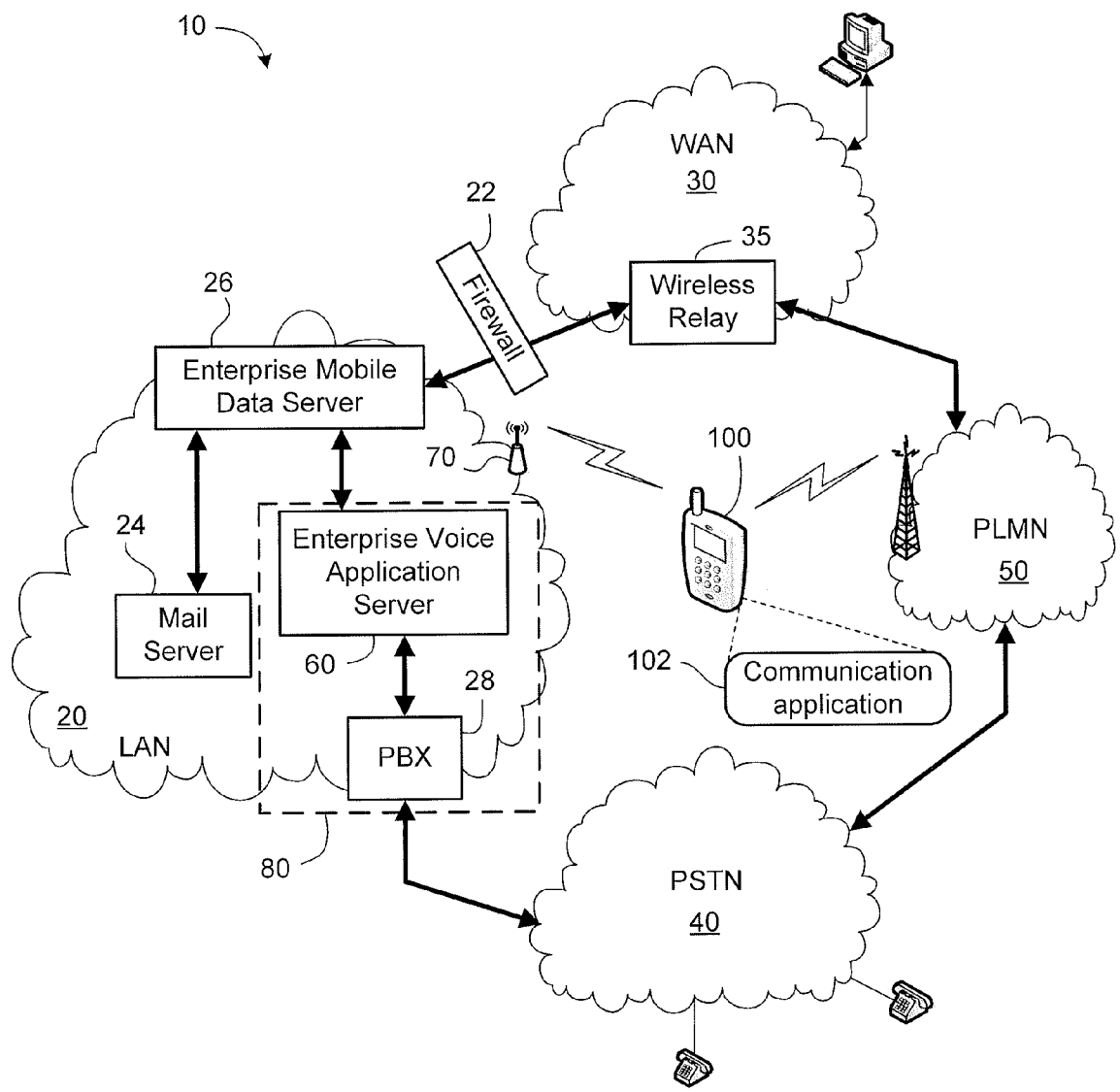
FIG. 1 shows, in block diagram form, an example system for managing enterprise-related mobile calls.

In one aspect, the present application provides a method of routing a call between an enterprise-associated mobile device and a remote party through an enterprise communications system. The method includes the steps of preventing a direct wireless voice call between the mobile device and the remote party via the public land mobile network; and, in response to a request to establish the call between the enterprise-associated mobile device and the remote party, establishing a first call between the enterprise-associated mobile device and the enterprise communications system, establishing a second call between the enterprise communications system and the remote party, and bridging the first call and the second call at the enterprise communications system to connect the enterprise-associated mobile device and the remote party.

In another aspect, the present application provides a system for enterprise-related call management of an enterprise-associated mobile device, the mobile device being configured for wireless communications over a public land mobile network. The system includes the mobile device and an enterprise communications system. The mobile device includes a communication application configured to prevent a direct wireless voice call between the mobile device and a remote party via the public land mobile network. The enterprise communications system comprises an enterprise voice application server and a private branch exchange (PBX). The enterprise communications system is configured to receive a request to establish a call between the mobile device and the remote party and is configured to, in response to the request, establish a first call between the mobile device and the enterprise communications system, establish a second call between the enterprise communications system and the remote party, and bridge the first call and the second call at the enterprise communications system to connect the mobile device and the remote party.

In yet another aspect, the present application provides a mobile device associated with an enterprise, the enterprise including an enterprise communications system for managing enterprise-related calls. The mobile device includes a communications subsystem for engaging in wireless communications with a public land mobile network, a memory, a user interface for outputting information and for receiving user input, a processor for controlling the communications subsystem, the memory, and the user interface, and a communication application executable by the processor and configured to prevent a direct wireless voice call between the mobile device and a remote party over the public land mobile network. The communication application is configured to establish a first call between the mobile device and the enterprise communications system in response to a request to establish a call between the remote party and the mobile device. The enterprise communications system is configured to establish a second call between the enterprise communications system and the remote party and to bridge the first call and the second call at the enterprise communication system to connect the mobile device and the remote party.

In yet another aspect, the present application provides a computer program product comprising a machine-readable medium having encoded thereon computer-executable instructions for routing a call between an enterprise-associated mobile device and a remote party through an enterprise communications system. The computer-executable instructions include instructions for preventing a direct wireless voice call between the mobile device and the remote party via a public land mobile network; and instructions, executable in response to a request to establish the call between the enterprise-associated mobile device and the remote party, for establishing a first call between the enterprise-associated mobile device and the enterprise communications system, establishing a second call between the enterprise communications system and the remote party, and bridging the first call and the second call at the enterprise communications system to connect the enterprise-associated mobile device and the remote party.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

Referring now to the drawings, FIG. 1 shows, in block diagram form, an example system 10 for managing enterprise-related mobile calls. The example system 10 includes an enterprise local area network (LAN) 20, which is connected, through a firewall 22, to a wide area network (WAN) 30, such as the Internet. The system 10 also includes a public switched telephone network (PSTN) 40, and a public land mobile network (PLMN) 50, which may also be referred to as a wireless wide area network (WWAN).

A mobile device 100 is associated with the enterprise LAN 20. In some scenarios, the mobile device 100 and the LAN 20 are owned or operated in common by the enterprise. For example, the mobile device 100 may be provided by the enterprise to one of its employees for use in connection with his or her employment.

The mobile device 100 is configured for wireless communication. In particular, the mobile device 100 includes an appropriate radio transceiver and associated software for communicating with the PLMN 50. The mobile device 100 is capable of both wireless voice and data communications via the PLMN 50. In various embodiments, the PLMN 50 and mobile device 100 may be configured to operate in compliance with any one or more of a number of wireless protocols, including GSM, GPRS, CDMA, EDGE, UMTS, EvDO, HSPDA, WiMAX, or a variety of others. It will be appreciated that the mobile device 100 may roam within the PLMN 50 and across PLMNs, in known manner, as the user moves.

The LAN 20 is enterprise-specific and typically includes a number of networked servers, computers, and other devices (not shown). The LAN 20 includes one or more mail servers, such as mail server 24, for coordinating the transmission, storage, and receipt of electronic messages for client devices operating within the LAN 20. Typical mail servers include the Microsoft Exchange Server™ and the IBM Lotus Domino™ server. Each user within the enterprise typically has at least one user account within the LAN 20. Associated with each user account is message address information, such as an e-mail address. Messages addressed to a user message address are stored on the LAN 20 in the mail server 24. The messages may be retrieved by the user using a messaging application, such as an e-mail client application. The messaging application may be operating on a user's computer connected to the LAN 20 within the enterprise. In some embodiments, the user may be permitted to access stored messages using a remote computer, for example at another location via the WAN 30 using a VPN connection. Using the messaging application, the user may also compose and send messages addressed to others, within or outside the LAN 20. The messaging application causes the mail server 24 to send a composed message to the addressee, often via the WAN 30.

The system 10 further includes a wireless relay 35 that serves to route messages received over the PLMN 50 from the mobile device 100 to the corresponding enterprise LAN 20. The wireless relay 35 also routes messages from the enterprise LAN 20 to the mobile device 100 via the PLMN 50. The wireless relay 35 is shown, in this embodiment, located with the WAN 30.

The LAN 20 also includes an enterprise mobile data server 26. Together with the wireless relay 35, the enterprise mobile data server 26 functions to redirect or relay incoming e-mail messages addressed to a user's e-mail address within the LAN 20 to the user's mobile device 100 and to relay incoming e-mail messages composed and sent via the mobile device 100 out to the intended recipients within the WAN 30 or elsewhere. The enterprise mobile data server 26 and wireless relay 35 together facilitate "push" e-mail service for the mobile device 100 enabling the user to send and receive e-mail messages using the mobile device 100 as though the user were connected to an e-mail client within the LAN 20 using the user's enterprise-related e-mail address.

As is typical in many enterprises, the LAN 20 includes a Private Branch exchange (PBX) 28 having a connection with the PSTN 40 for routing incoming and outgoing voice calls for the enterprise. On one side, the PBX 28 is connected to the PSTN 40, for example, via direct inward dialing (DID) trunks. The PBX 28 may use ISDN signaling protocols for establishing and breaking circuit-switched connections through the PSTN 40 and related signaling and communications. On its other side, the PBX 28 connects to the LAN 20 and, through the LAN 20, to telephone terminal devices (not shown) such as conventional desk sets, softphones, etc. Within the enterprise, each individual may have an associated extension number or direct dial phone number. Calls outgoing from the PBX 28 to the PSTN 40 or incoming from the PSTN 40 to the PBX 28 are typically digital circuit-switched calls. Within the enterprise, i.e. between the PBX 28 and terminal devices, calls are typically digital packet-switched calls. In some embodiments, calls over the LAN 20 are VoIP calls. The PBX 28 implements the switching to connect legs and provides the conversion between a circuit-switched call and a packet-switched call. In many embodiments, the PBX 28 provides a number of additional functions including automated attendant, interactive voice response, call forwarding, voice mail, etc. It may also implement certain usage restrictions on enterprise users, such as blocking international calls or premium-rate telephone calls.

The LAN 20 may also provide one or more wireless access points 70. The wireless access points 70 provide wireless local area network (WLAN) connectivity to mobile devices 100 within the enterprise campus. The wireless access points 70 may be configured in accordance with one of the IEEE 802.11 specifications. The mobile device 100 may be equipped with a suitable antenna, RF transceiver, and software for accessing and using the WLAN connectivity of the wireless access point 70, i.e. the mobile device 100 may be "Wi-Fi enabled". In this manner the mobile device 100 may establish an IP connection with the LAN 20 enabling relatively fast data communication.

It will be appreciated that a typical mobile device 100 with wireless connectivity to the PLMN 50 is capable of placing a user-dialed wireless voice call to a remote party. The remote party may be a remote mobile device located elsewhere in the PLMN 50 or another wireless network. The remote party may be a conventional telephone terminal device connected to the PSTN 40 and, in some instances, through a remote PBX. It will also be appreciated that the remote party may be reachable through a combination of these networks. Conversely, remote parties may dial the mobile device 100 and the call will be routed to the mobile device 100 via the PLMN 50.

When the user directly dials a remote party from the mobile device 100, the call is routed by the PLMN 50 and/or PSTN 40 based on the phone number of the dialed party and applicable call routing conventions or protocols. The mobile device 100 owner (typically the enterprise) often incurs wireless charges, especially if the call is a long-distance call. Many enterprises wish to monitor the activity of the users of their mobile devices in placing such calls so as to ensure that the calls are legitimately related to business activities and not for personal use. In some cases, the enterprise may wish to prevent certain calls from being placed or otherwise implement usage policies.

To provide for management of enterprise-related mobile calls, the LAN 20 includes a enterprise voice application server 60. The enterprise voice application server 60, together with the configuration of the mobile device 100, ensure that voice calls to or from the mobile device 100 are routed through the enterprise facilities. The mobile device 100 includes a communication application 102, which may include a phone application or other voice-based communication application, for placing and/or receiving cellular and/or VoIP voice calls.

The enterprise voice application server 60 is shown as a distinct server in FIG. 1; however, in one embodiment, the enterprise voice application server 60 and enterprise mobile data server 26 may be implemented on a common server platform. In another embodiment, the functions and operations of the enterprise voice application server 60 may be implemented as within the PBX 28. Other possibilities will also be appreciated.

The enterprise voice application server 60 and PBX 28 may collectively be referred to as the enterprise communications system 80 in some of the example embodiments discussed herein.

Figure 2:
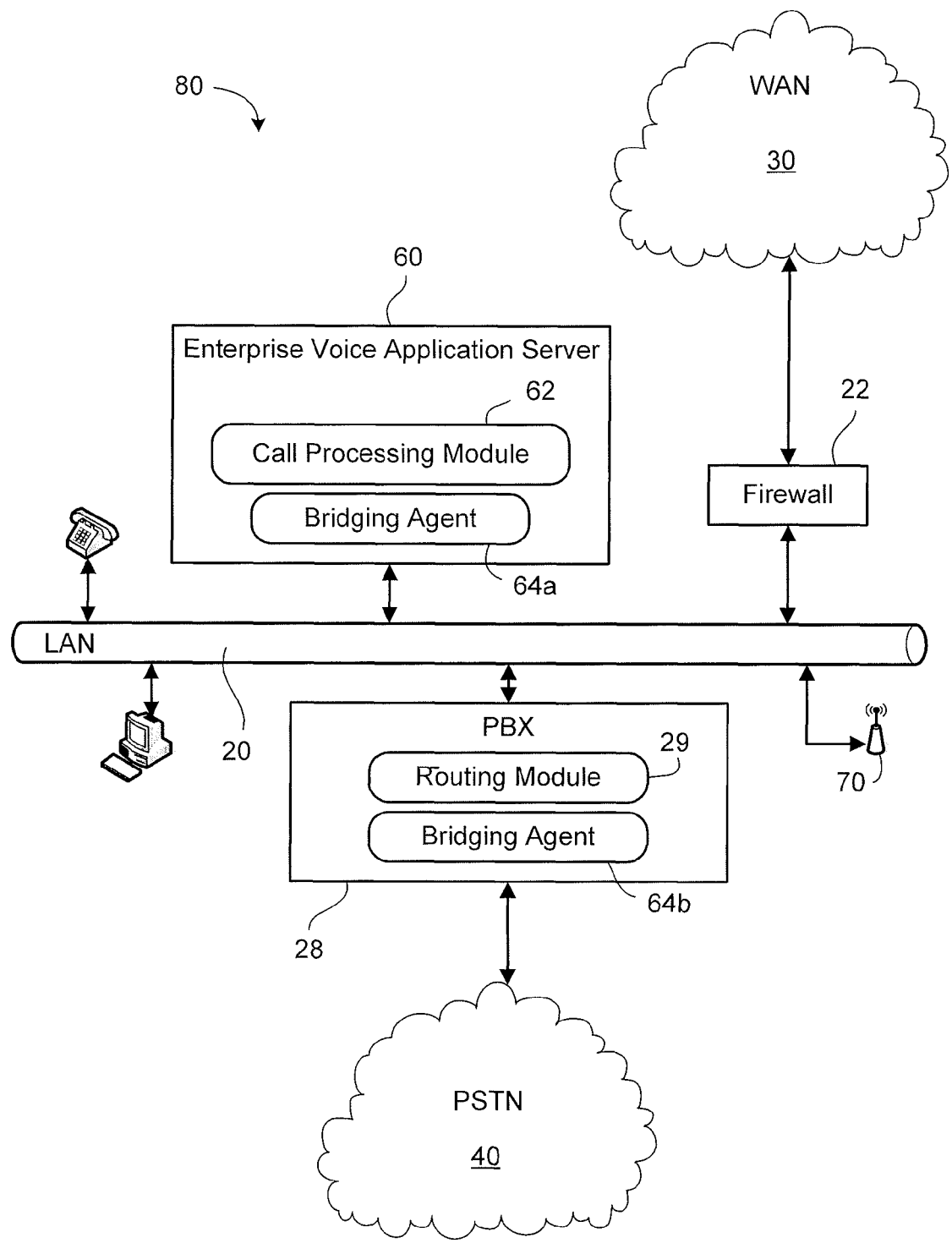
FIG. 2 shows, in block diagram form, further details of the enterprise communications system.

Reference is now made to FIG. 2, which shows, in block diagram form, further details of the enterprise communications system 80. The PBX 28 may include a routing module 29 for determining where and how to route incoming or outgoing calls. In some example embodiments, the enterprise communications system 80 may be configured to detect the presence or absence of a VoIP-capable IP connection with the mobile device 100.

The enterprise voice application server 60 includes a call processing module 62. The call processing module 62 allows the enterprise voice application server 60 to send and receive call set-up or management messages to and from the mobile device 100 and/or the PBX 28. In one embodiment, the messages may comprise Session Initiation Protocol (SIP) messages, although the present application is not limited to implementations involving SIP. The call processing module 62 may be configured to send and receive messages via a WLAN connection with the mobile device 100 through the access point 70, if such a connection is available. In the absence of a WLAN connection, the call processing module 62 may be configured to send and receive data messages via the WAN 30 and PLMN 50, i.e. through the enterprise mobile data server 26 and wireless relay 35. In yet other embodiments, the call processing module 62 may be configured to send data messages to the mobile device 100 through the PBX 28, for example as SMS messages.

The enterprise communications system 80 includes a bridging agent 64 (shown individually as 64a and 64b) for bridging or connecting two calls together at the enterprise communications system 80. In some embodiments, the bridging agent 64a is implemented within the enterprise voice application server 60. In some embodiments the bridging agent 64b is implemented within the PBX 28. In yet other embodiments, both the bridging agents 64a and 64b may be present. As will be described further below, a first call from a remote party routed through the PBX 28 may be terminated at the enterprise communications system 80, and a second call from the mobile device 100 may also be terminated at the enterprise communications system 80. The bridging agent 64 enables the enterprise communications system 80 to connect the two calls so as to connect the mobile device 100 to the remote party. In some embodiments, the second call may be a circuit-switched call or a VoIP call. It may be routed from the mobile device 100 to the enterprise communications system 80 through the PLMN 50 and PSTN 40, or through the WLAN connection via the access point 70, or through the PLMN 50 and WAN 30 via the wireless relay 35 and/or enterprise mobile data server 26. Some of these possibilities are discussed in greater detail below.

It will be appreciated that the call processing module 62 and bridging agent 64 may be implemented mainly by way of suitably programmed software components executed by one or more processors within the enterprise communications system 80.

Figure 3:
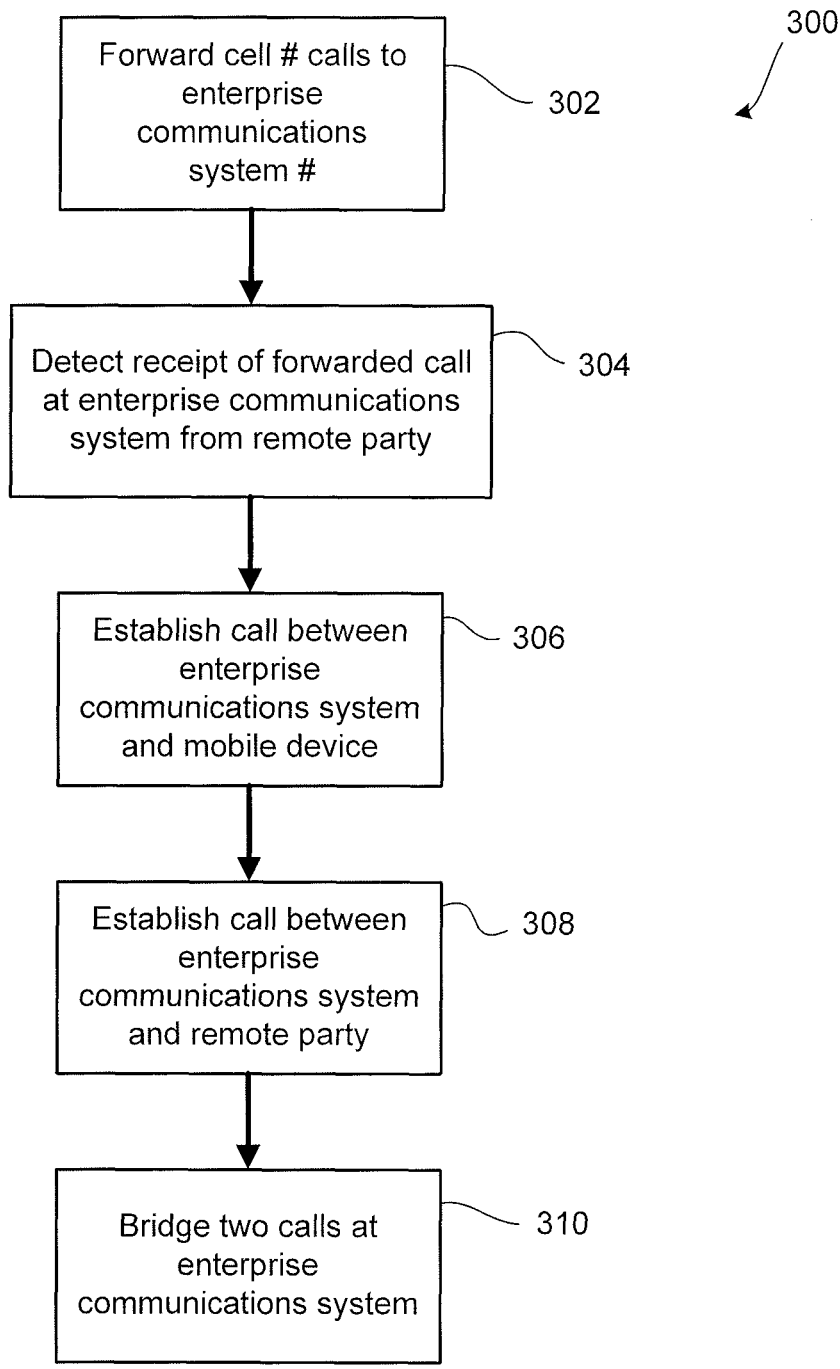
FIG. 3 shows a simplified flowchart reflecting an example method of managing an incoming enterprise-related mobile call.

Reference is now made to FIG. 3, which shows a simplified flowchart reflecting an example method 300 of managing an incoming enterprise-related mobile call in accordance with the present application. The method 300 begins with setting or configuring the mobile device 100 and/or PLMN 50 to forward all calls addressed to the mobile device's wireless phone number to an enterprise phone number. In some embodiments, the enterprise phone number to which calls are forwarded is the user's direct dial extension number within the enterprise. In some embodiments, the enterprise phone number is the general enterprise phone number that would otherwise be used to reach the PBX 28. In yet other embodiments, the enterprise phone number is a dedicated phone number for the PBX 28 intended only for the purpose of implementing the present mobile call management function, in which case it may be considered a direct dial extension for the enterprise voice application server 60.

It will be appreciated that the function of call forwarding is typically implemented within the PLMN 50. In practice, the mobile device 100, or an administrator with appropriate privileges, instructs the PLMN 50 to forward all calls for the mobile device 100 wireless phone number to the enterprise phone number. This call forwarding information is stored within memory in the PLMN 50 in known manner and any calls (or, more particularly, call requests) received by the PLMN 50 are redirected to the enterprise phone number. In many mobile devices the user may cancel call forwarding; however, in the present embodiment the call forwarding is not user-configurable. In other words the communications application 102 is configured to prevent user alteration or cancellation of the call forwarding command without, for example, administrator-level privileges. The call forwarding operation may be set by an enterprise administrator before the mobile device 100 is given to the enterprise employee. In some embodiments, the enterprise administrator may be able to set the call forwarding operation from a remote location by sending a suitable instruction or command to the PLMN 50 without the necessity of accessing the PLMN 50 through the mobile device 100 itself.

In step 304, the enterprise communications system 80 recognizes receipt of an incoming call request from the PSTN 40 as a forwarded call. The routing or header information with the call request indicates that the call was originally directed or addressed to the mobile device 100 and that the call was forwarded to the enterprise communications system 80. The enterprise communications system 80 is configured to recognize the forwarded call as being related to an enterprise-associated mobile phone, perhaps using a look-up table or such information in another form.

In step 306, the enterprise communications system 80 establishes a call between itself and the mobile device 100.

This step includes "ringing" the mobile device 100 and, if the user answers, establishing the call. A number of signaling mechanisms may be used to set up the call, as will be described below. In one embodiment, the call between the enterprise communications system 80 and the mobile device 100 is established as a VoIP call running over RTP atop the IP connection the mobile device 100 has with the access point 70. Any suitable VoIP session set-up protocol may be employed to establish the VoIP call, such as SIP signaling. For example, the enterprise communications system 80 may send a SIP INVITE message to the mobile device 100 and, if the user chooses to accept the call, the mobile device 100 responds with a SIP 200 OK message, etc.

In another embodiment, the call is established as a regular circuit-switched call from the mobile device 100 through PLMN 50 and PSTN 40 to the enterprise communications system 80. It will be appreciated that since the mobile device 100 has call forwarding configured to prevent any incoming calls, the enterprise communications system 80 rings the mobile device 100 by sending a data message regarding the incoming call request received by the enterprise communications system 80. The mobile device 100, and in particular the communication application 102, alerts the user by ringing, vibrating, or otherwise, depending on how the mobile device 100 is configured to alert the user to incoming call requests. If the user chooses to answer or accept the call, then the mobile device 100 places an outgoing wireless voice call via the PLMN 50 to the enterprise communications system 80. The phone number automatically dialed by the mobile device 100 may be predetermined phone number for the enterprise communications system 80. It may or may not be the same as the enterprise phone number to which calls to the mobile device 100 are forwarded. In any event, the enterprise communications system 80 recognizes the incoming call as originating from the enterprise-related mobile device 100 and the call is answered to complete a connection between the mobile device 100 and the enterprise communications system 80.

It will be appreciated that in some embodiments a VoIP call may also be established between the enterprise communications system 80 and the mobile device 100 via the WAN 30 and PLMN 50, provided that the mobile device 100 and PLMN 50 permit assignment of an IP address and provisioning of an IP connection to the mobile device 100. However, in some embodiments the delays inherent in operation of the enterprise mobile data server 26 and wireless relay 35 make real-time services such as VoIP between the LAN 20 and the mobile device 100 impractical over such a connection. Nevertheless, in some embodiments a suitable configuration that enables a connection with sufficient end-to-end QoS to support VoIP may be established.

Referring still to FIG. 3, in step 308, based on the mobile device 100 user's acceptance of the call, the enterprise communications system 80 accepts the incoming call request from the remote party that had been received in step 304. Thus a call is established between the enterprise communications system 80 and the remote party. The enterprise communications system 80 now terminates two calls: one with the mobile device 100 and one with the remote party.

In step 310, the enterprise communications system 80, and in particular the bridging agent 64, bridges the two calls together to connect the mobile device 100 to the remote party.

In this manner, an incoming call to the mobile device 100 is routed through the enterprise communications system 80, which allows the enterprise communications system 80 to impose usage policies and track calls.

Figure 4:
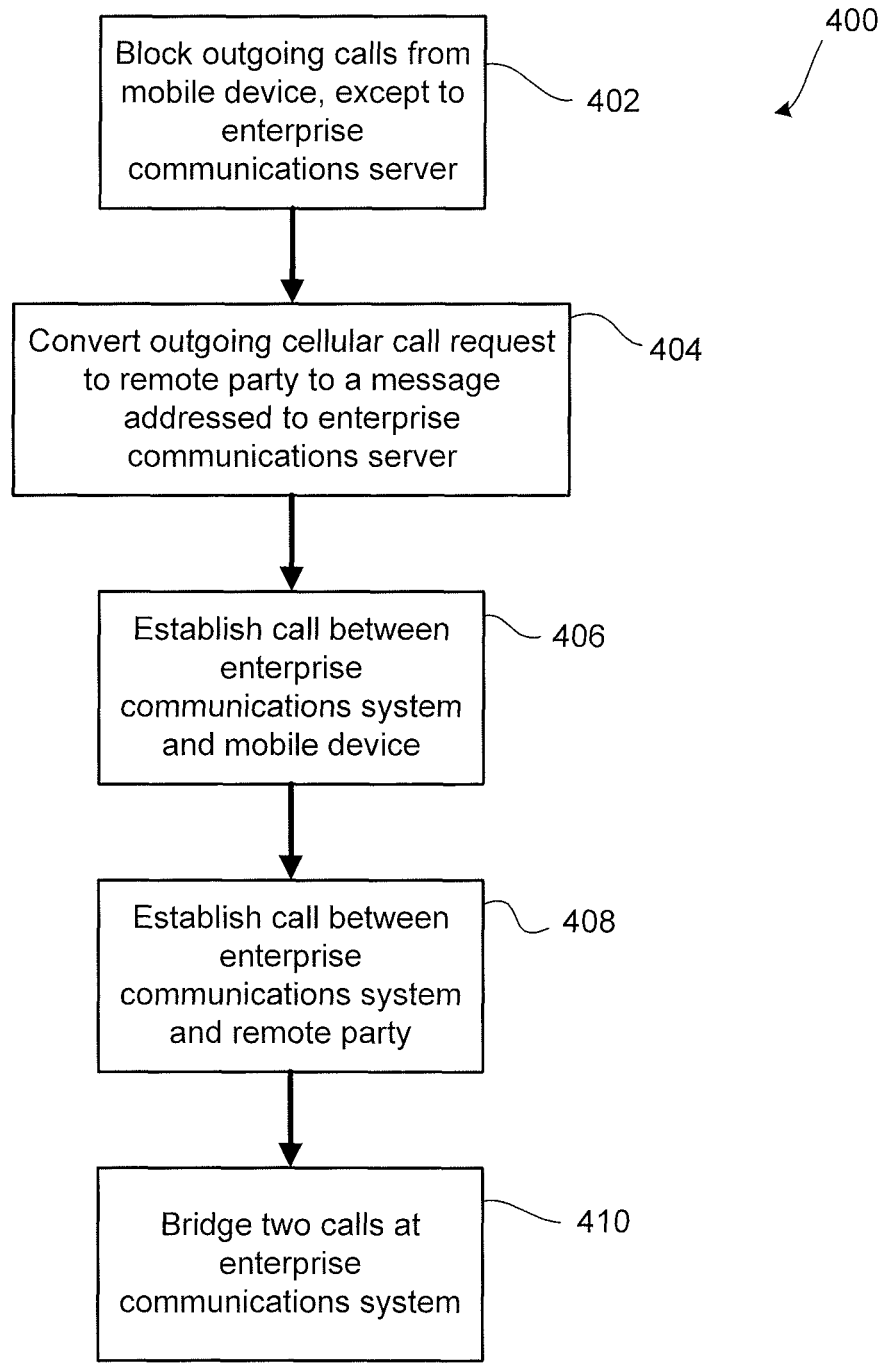
FIG. 4 shows a simplified flowchart reflecting an example method of managing an outgoing enterprise-related mobile call.

Reference is now made to FIG. 4, which shows a simplified flowchart reflecting an example method 400 of managing an outgoing enterprise-related mobile call in accordance with the present application. The method 400 begins in step 402 with the "blocking" or prevention of any direct outgoing calls from the mobile device 100. In practice, the configuration may be to prevent the mobile device 100 from placing calls other than to the enterprise communications system 80. As will be appreciated from the foregoing discussion in relation to FIG. 3, the mobile device 100 must be able to place a call to the enterprise communications system 80 via the PLMN 50 in order to receive a call. Accordingly, in many embodiments, step 402 comprises configuring the mobile device 100 to prevent outgoing calls from being dialed through the PLMN 50 unless they are addressed to the enterprise communications system 80 or to an emergency number, e.g. E911.

When the user requests a call to a remote party, e.g. dials a phone number, selects a speed dial option, etc., the communication application 102 on the mobile device 100 does not send a conventional cellular call request to the PLMN 50. Instead, as reflected in step 404, the mobile device 100 transmits a data message addressed to the enterprise communications system 80. The message may be sent through any data transmission path, including a WLAN connection via the access point 70, if any, or through the PLMN 50 and WAN 30. In some embodiments, the data message may be a SIP message. The data message may be transmitted via a data messaging function of the PLMN 50, such as an SMS message. Other possibilities will be understood by those skilled in the art.

The data message informs the enterprise communications system 80 of the mobile device 100 user's request to contact a remote party, and includes the remote party phone number. Then, in step 406, the mobile device 100 automatically calls the enterprise communications system 80. Meanwhile, in step 408, the enterprise communications system 80 places a call to the remote party via the PSTN 40. If the remote party answers, the call between the remote party and the enterprise communications system 80 is established, and the enterprise communications system 80 answers the incoming call from the mobile device 100, thereby establishing the call between the mobile device 100 and the enterprise communications system 80. In step 410, the two calls are bridged together at the enterprise communications system 80.

Referring again to step 406, the enterprise communications system 80 may send the mobile device 100 a message instructing the mobile device 100 call the enterprise communications system 80, in response to which the mobile device 100 places the automatic call to the enterprise communications system 80. The message may, in some embodiments, simply be an acknowledgement message in reply to the call request message from the mobile device 100 indicated in step 404. In some embodiments, the mobile device 100 places its the call to the enterprise communications system 80 via the PLMN 50 and PSTN 40 as a circuit-switched cellular call. In some embodiments, the mobile device 100 places the call to the enterprise communications system 80 as a VoIP call over the WLAN connection. In one embodiment, if a WLAN connection is available, the call between the mobile device 100 and the enterprise communications system 80 may be initiated by the enterprise communications system 80, since the call forwarding operation will not affect VoIP calls thereby enabling the enterprise communications system 80 to initiate the call with the mobile device 100. In some embodiments, SIP signaling may be used in the set-up of VoIP calls.

It will be appreciated that step 408 may be performed somewhat contemporaneously with step 406. For example, while the enterprise communications system 80 is awaiting an acceptance from the remote party, the enterprise communications system 80 may refrain from accepting the call from the mobile device 100 until acceptance of the other call from the remote party is received. Once the remote party answers the first call, then the enterprise communications system 80 may automatically answer the second call (from the mobile device 100), and then, in step 410, bridges the two calls together.

In this manner, any outgoing calls from the mobile device 100 are routed through the enterprise communications system 80. Accordingly, the enterprise may monitor call duration and manage usage restrictions. This has the added feature of making the call appear as though it were coming from the enterprise. In fact, the enterprise communications system 80 may be configured to have the call appear as through it originates from the user's extension number.

Figure 9:
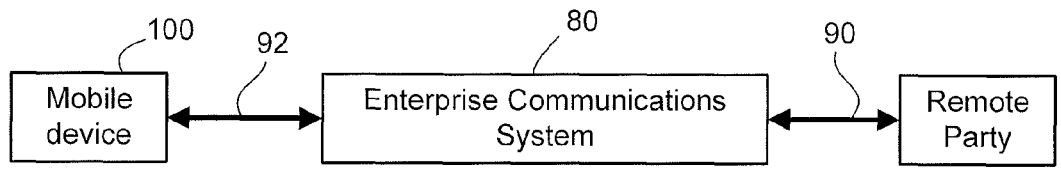
FIGS. 9 through 14, which contain block diagrams illustrating various embodiments and examples of call management in accordance with the present application.
Figure 10:
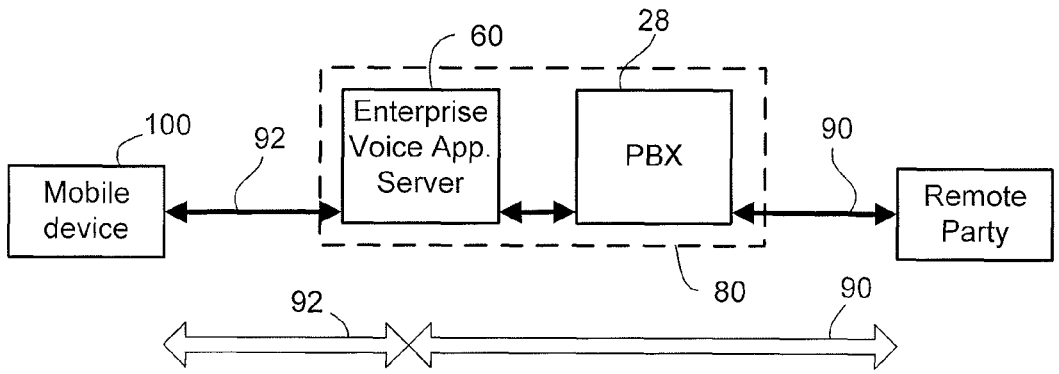
Figure 11:
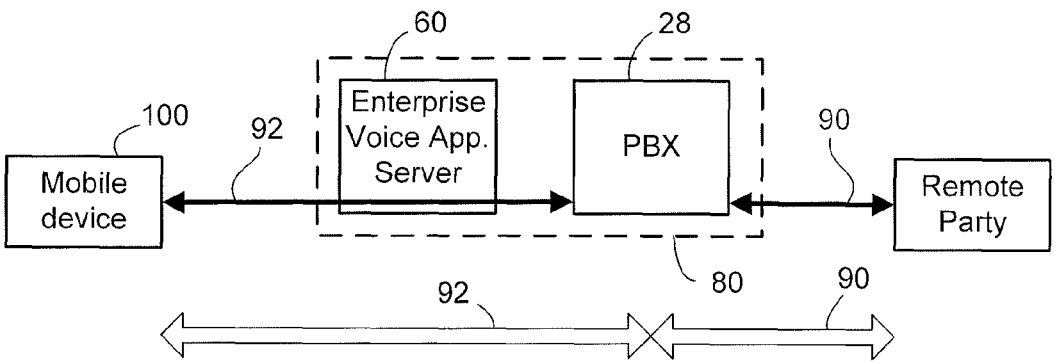
Figure 12:
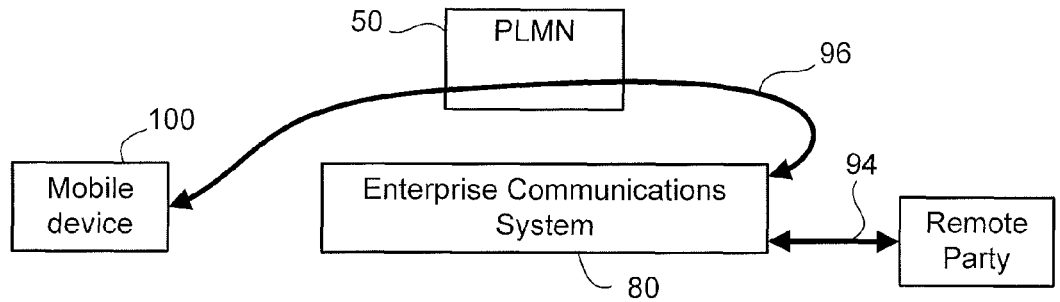
Figure 13:
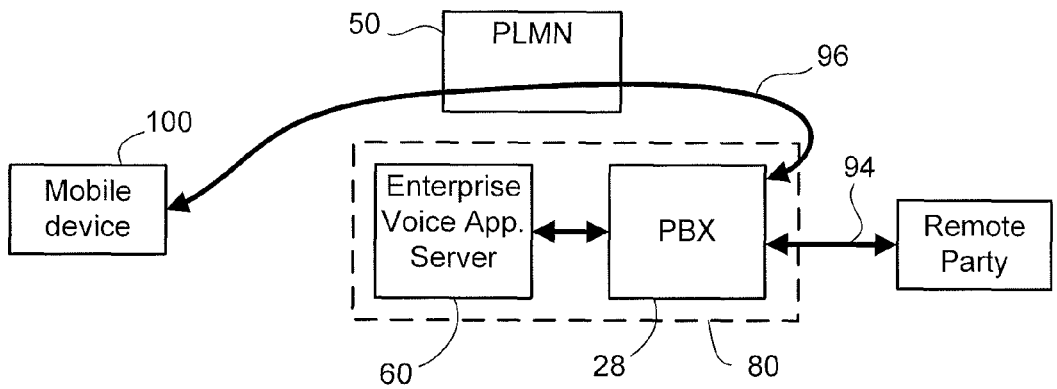
Figure 14:
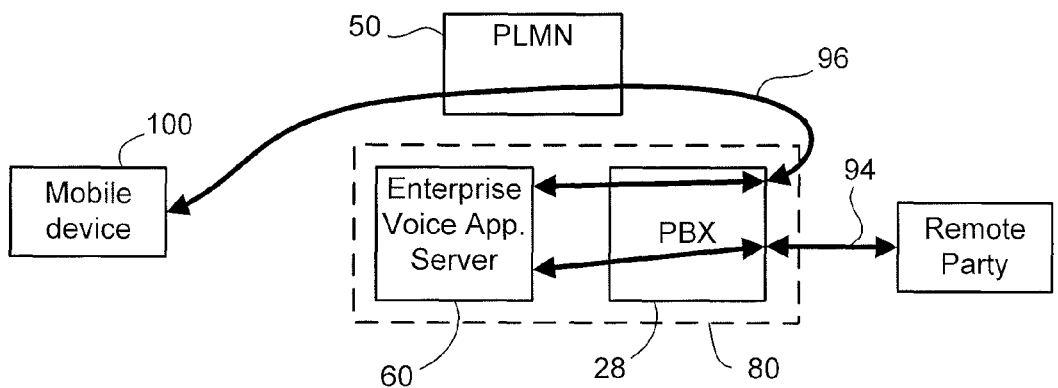

Reference is now made to FIGS. 9 through 14, which contain block diagrams illustrating various embodiments and examples of call management in accordance with the present application. FIGS. 9 through 11 illustrate embodiments in which a suitable IP connection is present between the mobile device 100 and the enterprise communications system 80 to permit a VoIP call. FIGS. 12 through 14 illustrate embodiments in which there is no IP connection or no suitable IP connection between the mobile device 100 and the enterprise communications system 80 to support a VoIP call.

FIG. 9 shows a generalized block diagram of an example call management architecture. In this example, the enterprise communication system 80 establishes a first call 90 with the remote party over a circuit-switched connection through the PSTN. A second call 92 is established by the enterprise communication system 80 with the mobile device 100 as a VoIP call over a suitable IP connection. The enterprise communication system 80 bridges the first call 90 and the second call 92 to connect the mobile device 100 with the remote party.

FIG. 10 shows a block diagram of an embodiment of the example call management architecture. In this embodiment, the enterprise communication system 80 includes the PBX 28 and the enterprise voice application server 60 as distinct entities. Calls between the PBX 28 and enterprise voice application server 60 may employ VoIP. In this embodiment, the first call 90 and second call 80 are both terminated at the enterprise voice application server 60. Accordingly, the first call 90 is composed of the circuit-switched leg from the PBX 28 to the remote party and the VoIP leg from the PBX 28 to the enterprise voice application server 60. The interface between the VoIP leg and the circuit-switched leg is managed by the PBX 28 in known manner. In this embodiment, the bridging of the first call 90 and the second call 92 occurs in the enterprise voice application server 60.

FIG. 11 shows a block diagram of a second embodiment of the example call management architecture. In this embodiment, the first call 90 and the second call 92 are both terminated at the PBX 28. The second call 92 comprises a VoIP call from the mobile device 100 to the PBX 28 passing through the enterprise voice application server 60. In one embodiment, this VoIP call may be set-up using two separate VoIP dialogs to create two VoIP calls, one between the mobile device 100 and the enterprise voice application server 60 and the other between the enterprise voice application server 60 and the PBX 28. In another embodiment, the VoIP is created using a single dialog to set-up a single call between the PBX 28 and the mobile device 100. Various mechanisms may be used to ensure that the set-up communications (e.g. SIP messaging) and the media path (e.g. RTP path) are routed through the enterprise voice application server 60. In the embodiment shown in FIG. 11, the bridging of the first call 90 and the second call 92 occurs at the PBX 28.

FIG. 12 shows a generalized block diagram of another example call management architecture. In this example, the enterprise communication system 80 establishes both a first call 94 with the remote party over a circuit-switched connection through the PSTN and a second call 96 with the mobile device over a circuit-switched connection through the PSTN. The enterprise communication system 80 bridges the first call 94 and the second call 96 to connect the mobile device 100 with the remote party.

FIG. 13 shows a block diagram of an embodiment of the example call management architecture from FIG. 12. In this embodiment, the enterprise communication system 80 includes the PBX 28 and the enterprise voice application server 60 as distinct entities. In this embodiment, the first call 94 and the second call 96 are terminated at the PBX 28, where they are bridged together. The enterprise voice application server 60 performs a management role in instructing the PBX 28 on the setting up, tearing down, and bridging of the calls using appropriate signaling and messaging.

FIG. 14, shows a block diagram of another embodiment of the example call management architecture from FIG. 12. In this embodiment, the first call 94 and second call 96 are terminated by the enterprise voice application server 60. The enterprise voice application server 60 may include a media server component for terminating and bridging the calls 94 and 96. The first call 94 may include the circuit-switched leg from the PBX 28 to the remote party and a VoIP leg between the PBX 28 and the enterprise voice application server 60. Similarly, the second call 96 may include a circuit-switched leg from the PBX 28 to the mobile device 100 and a VoIP leg from the PBX 28 to the enterprise voice application server 60.

Various example sequence diagrams are now presented to illustrate example embodiments of messaging processes for incoming and outgoing enterprise-related mobile calls. It will be appreciated that the sequence diagrams that follow do not necessary illustrate all the messaging and signaling that may occur. For example, for clarity and brevity the diagrams and discussion below do not necessarily show the 100 TRYING messages or the 180 RINGING messages normally used in SIP invite dialogs, but those skilled in the art will understand that these messages may be present in implementations.

In addition, in the diagrams discussed below the enterprise voice application server 60 and PBX 28 are shown as distinct entities. In many cases, the described signaling presumes the establishment of a VoIP call leg between the enterprise voice application server 60 and the PBX 28 and the bridging of calls at the enterprise voice application server 60. As described above in connection with FIG. 9 through 14, this VoIP leg may or may not be present and the bridging may occur at the PBX 28. Suitable modifications to the signaling to accommodate different embodiments will be apparent to those skilled in the art in light of the present disclosure.

Figure 5:
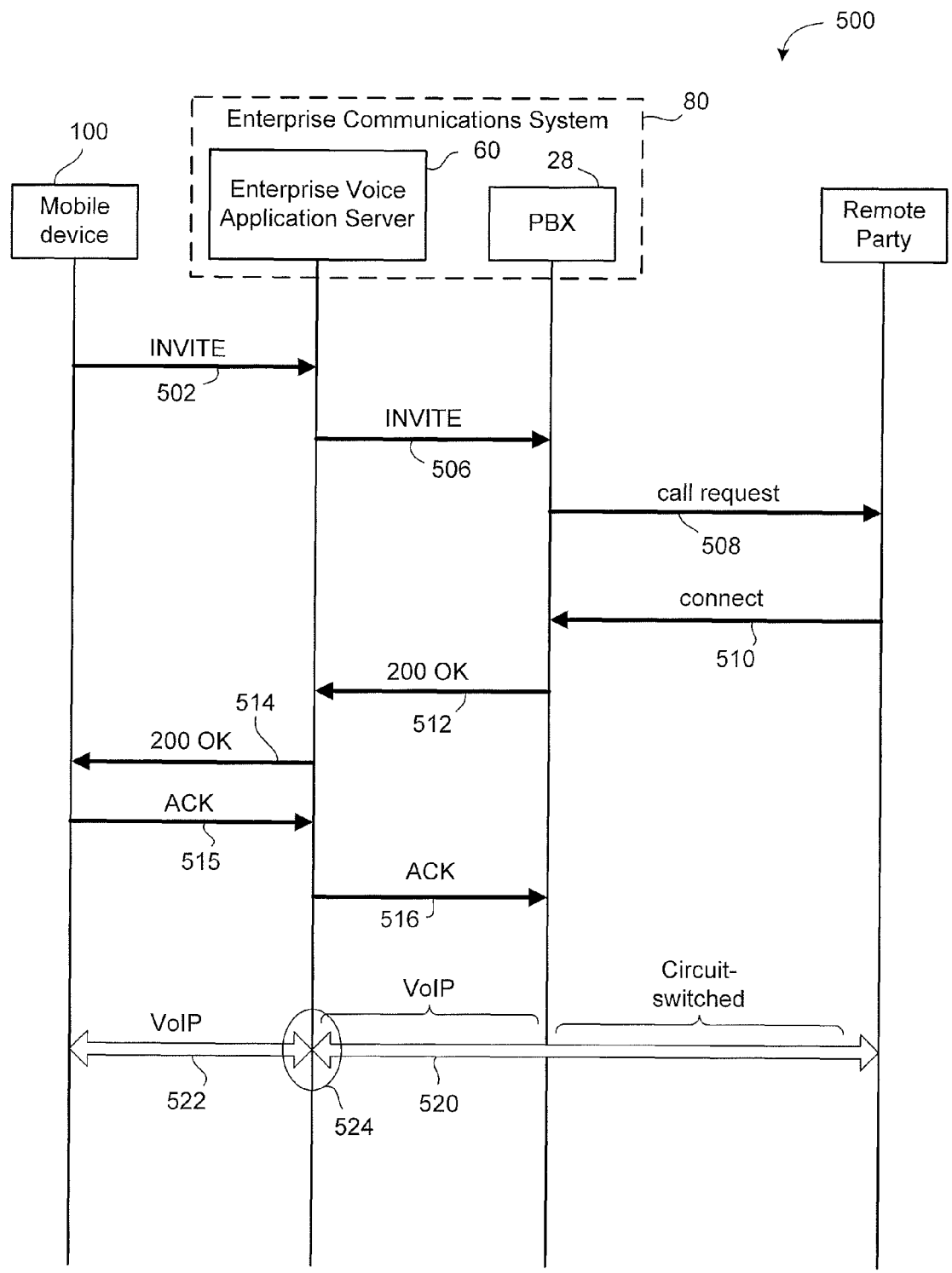
FIG. 5 diagrammatically illustrates a call sequence for placing an outgoing call from an enterprise-related mobile device.

Reference is first made to FIG. 5, which diagrammatically illustrates a call sequence 500 for placing an outgoing call from an enterprise-related mobile device. This example presumes a suitable IP connection is available for establishing a VoIP call between the mobile device 100 and the enterprise voice application server 60. This example also presumes that the enterprise voice application server 60 acts as a "back-to-back" user agent. In other words, that the enterprise voice application server 60 terminates both the VoIP calls, as will be described below. Variations will be apparent to those skilled in the art.

The sequence 500 begins when the user of the mobile device 100 attempts to place a call to a remote party, for example by dialing the remote party's telephone number. In response to the user request, the mobile device 100 transmits a call request message 502 to the enterprise voice application server 60. The call request message 502 includes the phone number of the remote party. In a SIP-compliant embodiment, the call request message 502 may comprise a SIP INVITE message. It will be appreciated that call set-up signaling other than SIP may be used in some embodiments.

The enterprise voice application server 60 sends an outgoing call request to the remote party via the PBX 28. As indicated above, in some embodiments, this includes generating and sending a SIP INVITE message 506 addressed to the PBX 28, whereupon the PBX 28 generates and sends an outgoing circuit-switched call request 508 addressed to the remote party.

If the remote party answers the call, a connect message 510 or signal is received by the PBX 28, which then accepts the invite from the enterprise voice application server 60 with a 200 OK message 512. The enterprise voice application server 60 then accepts the invite from the mobile device 100 with its own 200 OK message 514. An ACK message 515 from the mobile device 100 to the enterprise voice application server 60 completes the VoIP call set-up for the path 522 between the mobile device 100 and the enterprise voice application server 60. An ACK message 516 from the enterprise voice application server 60 to the PBX 28 completes the VoIP call set-up for the path 520 between the enterprise voice application server 60 and the PBX 28.

The enterprise voice application server 60 then bridges the two VoIP calls together to connect the mobile device 100 to the remote party, as indicted by reference numeral 524.

Figure 6:
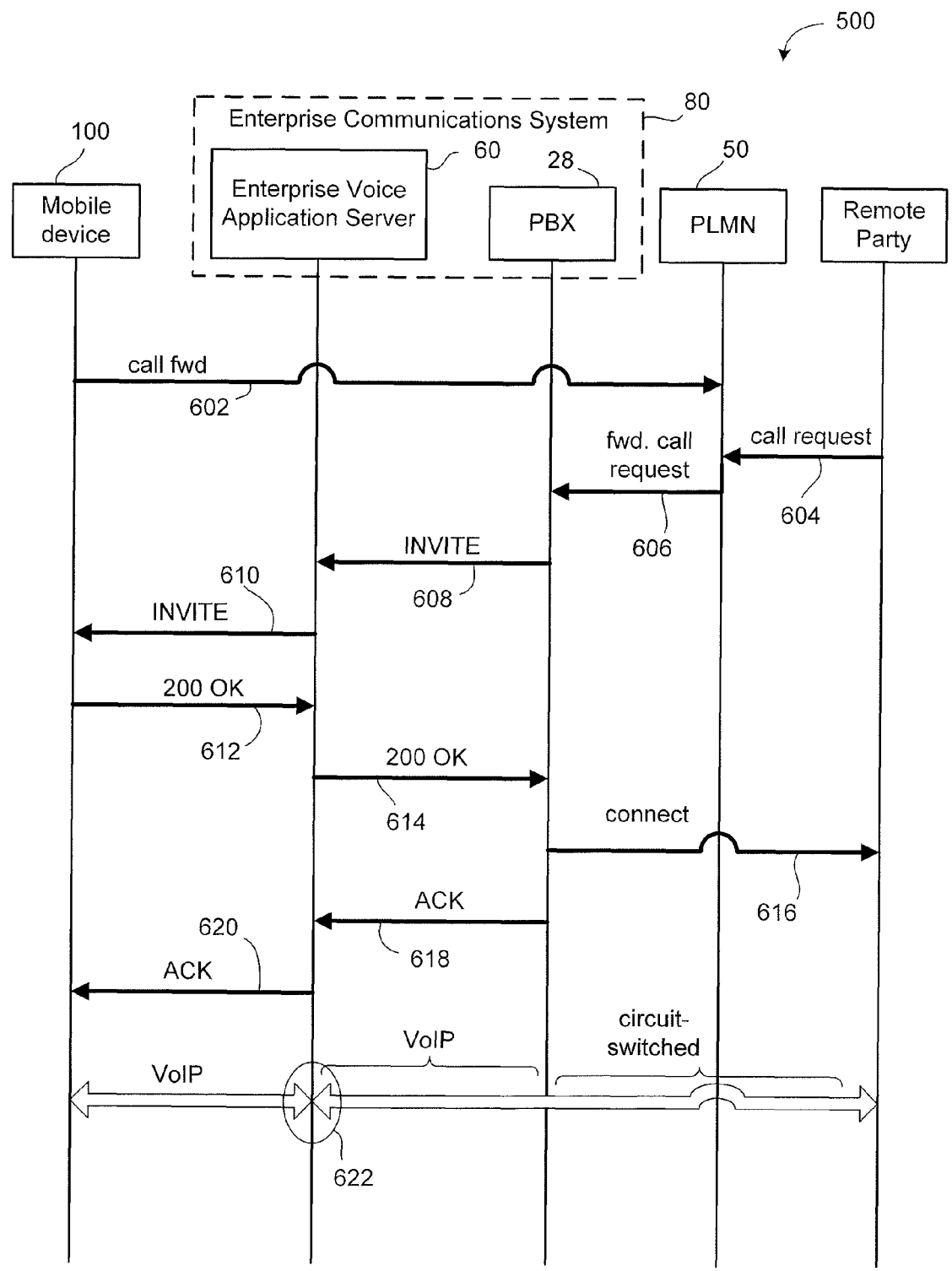
FIG. 6 shows a call sequence for receiving an incoming call for an enterprise-related mobile device.

Reference is now made to FIG. 6, which shows a call sequence 600 for receiving an incoming call for an enterprise-related mobile device. As with FIG. 5, this example presumes a suitable IP connection is available for establishing a VoIP call between the mobile device 100 and the enterprise voice application server 60.

The sequence 600 begins with a call forwarding instruction 602 to the PLMN 50. The call forwarding instruction 602 is shown as originating from the mobile device 100; however, it will be appreciated that the instruction may originate with a system administrator within the enterprise. In many embodiments, the user of the mobile device 100 is not afforded the authority to alter or cancel the call forwarding instruction 602. The mobile device 100 may be configured to prevent the user from adjusting call forwarding.

The PLMN 50 receives an incoming call request signal 604 originated by a remote party. It will be appreciated that the incoming call request signal 604 may be routed through a number of other networks, such as the PSTN (not shown), depending on the location of the mobile device 100 and the location of the remote party.

The PLMN 50 forwards the call request to the PBX 28, or more particularly, to an enterprise telephone number that resolves to the PBX 28 via the PSTN (not shown). The PBX 28 passes the forwarded call request 606 to the enterprise voice application server 60. In some embodiments, this may include composing and sending a SIP INVITE message 608 to the enterprise voice application server 60. The PBX 28 may detect the fact that the call request is forwarded by the PLMN 50 and that it relates to an enterprise-related mobile device number, and its message to the enterprise voice application server 60 may be formed accordingly. For example, in one embodiment, the SIP INVITE message 608 may be addressed to the mobile device 100, although routed through the enterprise voice application server 60. The invite to the mobile device 100 may be routed through the enterprise voice application server 60 as result of a pre-configuration within the PBX 28, a Path command in the course of registration as described in RFC 3327, or any other such mechanism applicable to a specific embodiment.

In another embodiment, the enterprise number to which the call request is forwarded is specific to the enterprise voice application server 60, and the PBX 28 passes through the forwarded call request 606 as the SIP INVITE message 608 addressed to the enterprise voice application server 60. The SIP INVITE message 608 includes sufficient information from the forwarded call request 606 for the enterprise voice application server 60 itself to identify the forwarded call request 606 as having being addressed to an enterprise-related mobile device.

After receiving the SIP INVITE message 608 from the PBX 28, the enterprise voice application server 60 sends a SIP INVITE message 610 to the mobile device 100. The SIP INVITE message 610 may identify the remote party, if that information is available to the enterprise voice application server 60. If the user accepts the incoming call on his or her mobile device 100, i.e. answers the call, the mobile device 100 transmits an acceptance message, such as a SIP 200 OK message 612 to the enterprise voice application server 60. The enterprise voice application server 60 then sends a SIP 200 OK message 614 to the PBX 28. The PBX 28 then answers the call request from the remote party using the appropriate signaling 616 to connect the circuit-switched call.

The PBX 28 also responds to the 200 OK message 614 by transmitting a SIP ACK message 618 to the enterprise voice application server 60 to start the VoIP call between the PBX 28 and the enterprise voice application server 60. The enterprise voice application server 60 transmits an ACK message 620 to the mobile device 100 to start that leg of the VoIP call. The enterprise voice application server 60 then bridges the two VoIP calls to connect the mobile device 100 with the remote party, as indicated with reference numeral 622.

Figure 7:
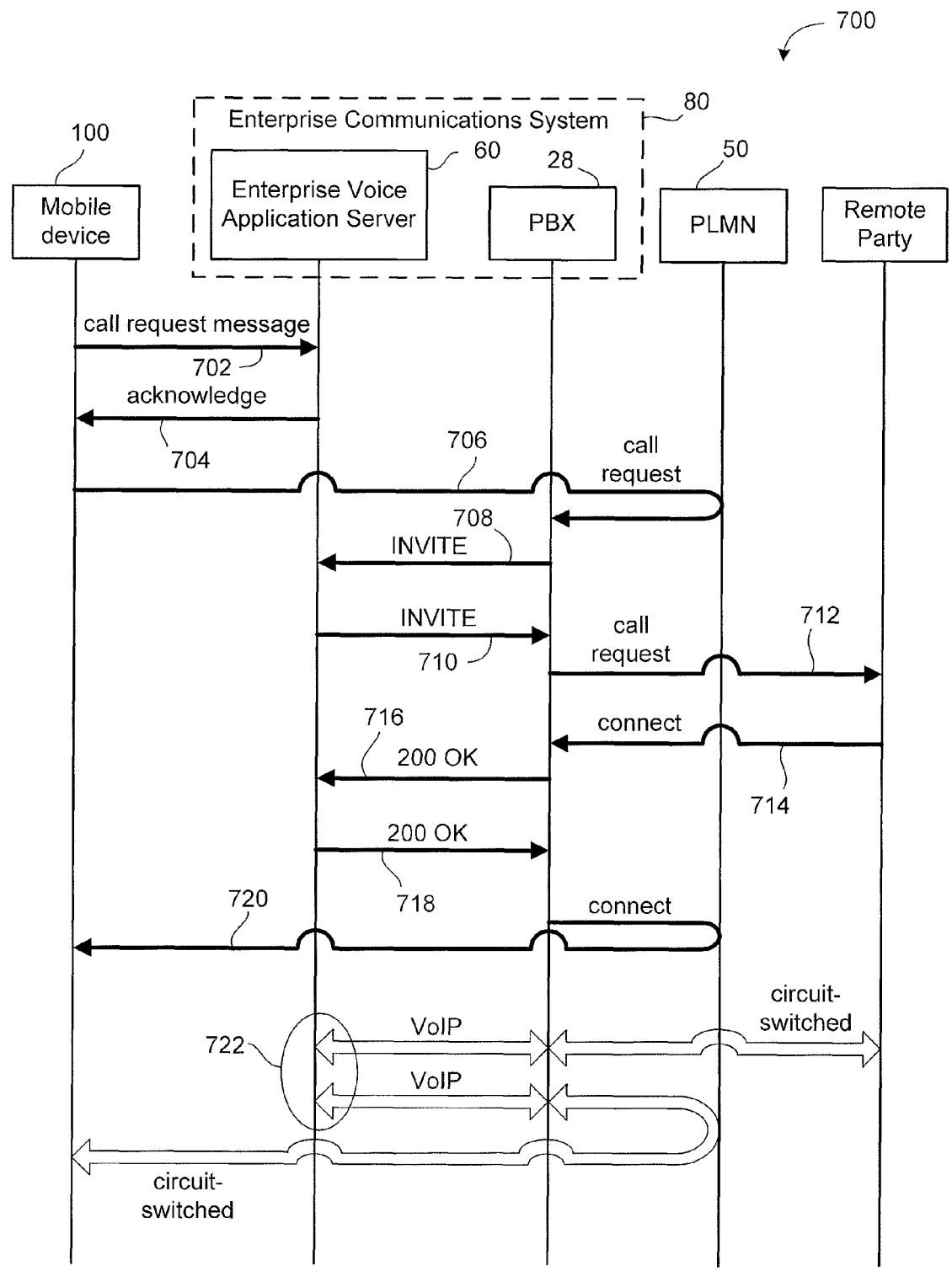
FIG. 7 diagrammatically illustrates a call sequence for placing an outgoing call from an enterprise-related mobile device.

Reference is now made to FIG. 7, which diagrammatically illustrates a call sequence 700 for placing an outgoing call from an enterprise-related mobile device. In this example, no IP connection with the mobile device 100 exists that can support a VoIP call.

The sequence 700 begins when the user of the mobile device 100 attempts to place a call to a remote party, for example by dialing the remote party's telephone number. The mobile device 100 is preconfigured to prevent the user from directly dialing a remote party through the PLMN 50, so the mobile device 100 does not send the dialed number to the PLMN 50 in a call request. Instead, in response to the user request, the mobile device 100 transmits a call request message 702 to the enterprise voice application server 60. The call request message 702 includes the phone number of the remote party. The call request message 702 may be sent over any suitable data communications connection, such as through the PLMN 50. The enterprise voice application server 60 may send the mobile device 100 an acknowledgement message 704 acknowledging receipt of the call request message 702.

The mobile device 100 then automatically places a voice call request 706 to the enterprise voice application server 60 via the PLMN 50. The voice call request 706 is received by the PBX 28. The enterprise voice application server 60 is notified of the voice call request 706 in one manner or another. For example, in the present embodiment, the PBX 28 sends the enterprise voice application server 60 a SIP INVITE message 708 based on the call request from the mobile device 100. In other embodiments, other messaging may be used.

Based on the call request message 702 received from the mobile device 100, the enterprise voice application server 60 is aware that the mobile device 100 wishes to connect with the remote party. Accordingly, the enterprise voice application server 60 sends a SIP INVITE message 710 to the PBX 28 addressed to the remote party. The PBX 28 sends a corresponding call request 712 to the remote party via the PSTN (not shown). The SIP INVITE message 710 may be structured by the enterprise voice application server 60 so as to appear to the remote party as though it comes from the mobile device user's enterprise telephone number, in terms of caller ID and such features.

If the remote party chooses to answer the call request 712, the PBX 28 receives an acceptance message or signal, here referred to as a connect signal 714. The PBX 28 then sends a SIP 200 OK message 716 to the enterprise voice application server 60 to accept the SIP INVITE message 710. The enterprise voice application server 60 sends the PBX 28 an ACK message (not shown) to complete the VoIP call between the enterprise voice application server 60 and the PBX 28, thereby connecting the enterprise voice application server 60 to the remote party in one call.

The enterprise voice application server 60 also sends a 200 OK message 718 to the PBX 28 in reply to the SIP INVITE message 708 received with regard to the incoming call from the mobile device 100. An ACK message (not shown) completes the second VoIP call between the enterprise voice application server 60 and the PBX 28, however this second VoIP call is connected at the PBX 28 to the circuit-switched incoming call from the mobile device 100. The PBX 28 answers the call request 706 received from the mobile device 100 with a connect signal 720 in order to complete the call connection between the enterprise voice application server 60 and the mobile device 100.

The enterprise voice application server 60 now has two separate active calls routed through the PBX 28: one with the mobile device 100 and one with the remote party. The enterprise voice application server 60 then bridges the two calls together, as indicated by reference number 722.

In another embodiment (not illustrated), the calls are terminated at the PBX 28 and are not routed through to the enterprise voice application server 60. Accordingly, the bridging of the two calls occurs at the PBX 28. In this embodiment, the enterprise voice application server 60 continues to manage the set-up and tear down of the calls and sends messages/signals to the PBX 28 instructing the PBX 28 to take particular actions, but the enterprise voice application server 60 does not actually handle the media streams.

Figure 8:
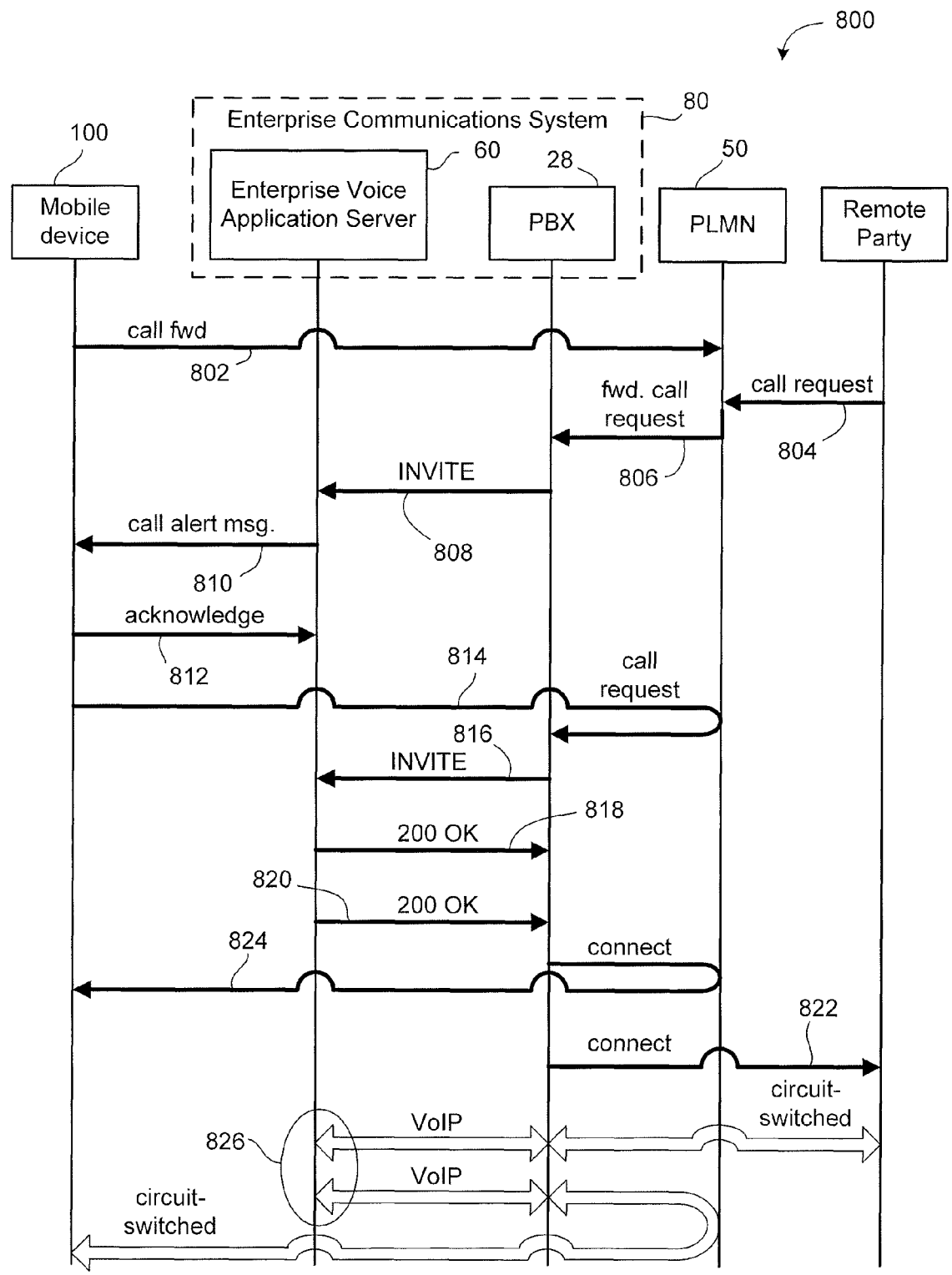
FIG. 8 shows a call sequence for receiving an incoming call from an enterprise-related mobile device.

FIG. 8 shows a call sequence 800 for receiving an incoming call from an enterprise-related mobile device. In this example, no IP connection with the mobile device 100 exists that can support a VoIP call.

The sequence 800 begins with a call forwarding instruction 802 to the PLMN 50. The call forwarding instruction 802 is shown as originating from the mobile device 100; however, it will be appreciated that the instruction may originate with a system administrator within the enterprise. In many embodiments, the user of the mobile device 100 is not afforded the authority to alter or cancel the call forwarding instruction 802. The mobile device 100 may be configured to prevent the user from adjusting call forwarding.

The PLMN 50 receives an incoming call request signal 804 originated by a remote party. It will be appreciated that the incoming call request signal 804 may be routed through a number of other networks, such as the PSTN (not shown), depending on the location of the mobile device 100 and the location of the remote party.

The PLMN 50 forwards the call request to the PBX 28, or more particularly, to an enterprise telephone number that resolves to the PBX 28 via the PSTN (not shown). The PBX 28 passes the forwarded call request 806 to the enterprise voice application server 60. In some embodiments, this may include composing and sending a SIP INVITE message 808 to the enterprise voice application server 60. The PBX 28 may detect the fact that the call request is forwarded by the PLMN 50 and that it relates to an enterprise-related mobile device number, and its message to the enterprise voice application server 60 may be formed accordingly. For example, the SIP INVITE message 808 may include sufficient information from the forwarded call request 806 for the enterprise voice application server 60 itself to identify the forwarded call request 806 as having being addressed to an enterprise-related mobile device.

In response to the SIP INVITE message 808, which the enterprise voice application server 60 identifies as resulting from a redirected call request originally addressed to an enterprise-related mobile device, the enterprise voice application server 60 generates and sends a call alert message 810 to the mobile device 100. The call alert message 810 may take the form of any suitable data message for informing the mobile device 100 of the incoming call request from the remote party. An acknowledgement or ringing message 812 may be returned to the enterprise calls server 60, in some embodiments. The mobile device 100, and in particular the communication application 102 (FIG. 1), is configured for receiving the call alert message 810 and notifying the user of the requested call, for example using ringtones, vibrations, visual displays, or combinations of such alert mechanisms. If the user accepts the incoming call, then the mobile device 100 automatically places an outgoing voice call 814 to the PBX 28 via the PLMN 60. As indicated previously, the mobile device 100 is preconfigured to prevent any outgoing voice calls via the PLMN 50 unless those calls are addressed to the PBX 28.

The outgoing voice call 814 from the mobile device 100 is received by the PBX 28 via the PLMN 50 and PSTN (not shown). The PBX 28 then generates and sends the enterprise voice application server 60 a SIP INVITE message 816 with regard to the incoming call from the mobile device 100, which the enterprise voice application server 60 may treat as acceptance of the call request from the remote party. Accordingly, the enterprise voice application server 60 sends a SIP 200 OK message 818 to the PBX 28 to accept the call from the mobile device 100, and a SIP 200 OK message 820 to the PBX 28 to accept the call from the remote party. The PBX 28 sends the appropriate connect messages 822 and 824 or signal via the PSTN to complete the circuit-switched calls with the remote party and the mobile device 100. Suitable ACK messages (not shown) from the PBX 28 to the enterprise voice application server 60 complete the two VoIP calls. As a result, the enterprise voice application server 60 has a first call set up with the mobile device 100 routed through the PBX 28 and PLMN 50, and a second call set up with the remote party routed through the PBX 28 and PSTN (not shown). Other networks may also be included in the circuit-switched paths, as will be appreciated.

The enterprise voice application server 60 then connect or bridges the two calls, as indicated by reference numeral 826, to complete the connection between the mobile device 100 and the remote party.

In another embodiment (not illustrated), the calls are terminated at the PBX 28 and are not routed through to the enterprise voice application server 60. Accordingly, the bridging of the two calls occurs at the PBX 28. In this embodiment, the enterprise voice application server 60 continues to manage the set-up and tear down of the calls and sends messages/signals to the PBX 28 instructing the PBX 28 to take particular actions, but the enterprise voice application server 60 does not actually handle the media streams.

Certain adaptations and modifications of the described embodiments can be made. Therefore, the above discussed embodiments are considered to be illustrative and not restrictive.

What is claimed is:

1. A method of connecting a call from a remote party device to an enterprise-associated mobile device having a phone number, the mobile device being configured for wireless communications over a public land mobile network, wherein the public land mobile network is directly instructed by the mobile device based on administrator-level privileges configured within the mobile device to call forward a call request originally intended to the phone number of the mobile device to an enterprise phone number using a call forward command of the public land mobile network, the enterprise phone number being associated with the mobile device, wherein the mobile device is configured to prevent user-level alteration of configuration of the public land mobile network with regard to call forwarding call requests addressed to the mobile device, the method comprising:

receiving, at the enterprise communications system, a call request to the enterprise phone number, the call request being call-forwarded by the public land mobile network in execution of the call forward command of the public land mobile network and originating as a call request from the remote party device to the phone number of the mobile device;

establishing, at the enterprise communication system, a first call leg between the mobile device and the enterprise communications system, establishing, at the enterprise communication system, a second call leg between the enterprise communications system and the remote party device, and bridging, at the enterprise communication system, the first and second call legs to connect the mobile device and the remote party device, completing the call from the remote party device to the mobile device, wherein the first and second call legs each include a voice call.

2. The method claimed in claim 1, further comprising detecting a Voice-over IP (VoIP)-capable IP connection with the mobile device and wherein establishing the first call leg comprises establishing a VoIP call between the mobile device and the enterprise communications system.

3. The method claimed in claim 1, further comprising detecting absence of a VoIP-capable IP connection with the mobile device and wherein establishing the first call leg comprises:

sending a data message from the enterprise communications system to the mobile device informing the mobile device of the request from the remote party device; and receiving, at the enterprise communications system, a circuit-switched voice call via the public land mobile network from the mobile device, the circuit-switched voice call being addressed to the enterprise communications system, in response to acceptance of the request by the user of the mobile device, wherein the circuit-switched voice call is placed automatically by the mobile device in response to said acceptance.

4. The method claimed in claim 1, the method further comprising:

configuring the mobile device to block direct dial calls via the public land mobile network except calls addressed to the enterprise communications system, and transmitting a data message addressed to the enterprise communications system in response to a user request to call the remote party device, the data message comprising a telephone address for the remote party device.

5. The method claimed in claim 4, further comprising detecting a VoIP-capable IP connection with the mobile device and wherein establishing the first call leg comprises establishing a VoIP call between the mobile device and the enterprise communications system.

6. The method claimed in claim 4, further comprising detecting the absence of a VoIP-capable IP connection with the mobile device and wherein establishing the first call leg comprises:

sending an acknowledgement message from the enterprise communications system to the mobile device in response to said data message; and receiving, at the enterprise communications system, a circuit-switched voice call via the public land mobile network from the mobile device, the circuit-switched voice call being addressed to the enterprise communications system, and wherein the circuit-switched voice call is placed automatically by the mobile device in response to said acknowledgement message.

7. The method claimed in claim 1, wherein the enterprise communication system comprises a private branch exchange (PBX) and an enterprise voice application server connected via a local network, and wherein establishing the second call leg with the remote party device includes completing a circuit-switched voice connection with the remote party device through the public switched telephone network via the PBX.

8. The method claimed in claim 7, wherein the first call leg and the second call leg are terminated at the PBX and bridging the first and second call legs is performed by the PBX under the control of the communication management server.

9. The method claimed in claim 7, wherein the first call leg and the second call leg are terminated at the enterprise voice application server and bridging the first and second call legs is performed by the enterprise voice application server.

10. The method claimed in claim 1, wherein said call forward request is originally sent from the mobile device to the public land mobile network, prior to said alteration being prevented.

11. The method claimed in claim 1, wherein the mobile device is further configured to prevent a direct wireless voice call between the mobile device and the remote party device over the public land mobile network.

12. A system for enterprise-related call management, comprising:

an enterprise communications system including an enterprise voice application server and a private branch exchange (PBX);

an enterprise-associated mobile device having a phone number, the mobile device being configured for wireless communications over a public land mobile network, wherein the public land mobile network is directly instructed by the mobile device based on administrator-level privileges configured within the mobile device to call forward a call request originally intended to the phone number of the mobile device to an enterprise phone number using a call forward command of the public land mobile network, the enterprise phone number being associated with the mobile device, wherein the mobile device is configured to prevent user-level alteration of configuration of the public land mobile network with regard to call forwarding call requests addressed to the mobile device; and the enterprise communications system being configured to receive a call request to the enterprise phone number which terminates to the PBX, the call request being call-forwarded by the public land mobile network in execution of the call forward command of the public land mobile network and originating as a call request from the remote party device to the phone number of the mobile device, establish a first call leg between the mobile device and the enterprise communications system, establish a second call leg between the enterprise communications system and the remote party device, and bridge the first second call legs to connect the mobile device and the remote party device, completing the call from the remote party device to the mobile device, wherein the first and second call legs each include a voice call.

13. The system claimed in claim 12, wherein the enterprise communications system is configured to detect the presence of a VoIP-capable IP connection with the mobile device and, if so detected, establish the first call leg as a VoIP call between the enterprise communication system and the mobile device over said IP connection.

14. The system claimed in claim 12, wherein the enterprise communications system is configured to detect the absence of a VoIP-capable IP connection with the mobile device and, if the absence is detected, send the mobile device a data message informing the mobile device of the request from the remote party device, and wherein the mobile device is configured to output a user alert in response to the data message regarding the request, receive a user input accepting the request, and, in response to the user input, automatically place a circuit-switched voice call via the public land mobile network addressed to the enterprise communications system.

15. The system claimed in claim 12, wherein the enterprise communication system is configured to receive a request by the mobile device to establish a call with the remote party device, and in response to the request, to establish a first call leg between the mobile device and the enterprise communications system, establish a second call leg between the enterprise communications system and the remote party device, and bridge the first call leg and the second call leg at the enterprise communications system to connect the mobile device and the remote party device; and wherein the mobile device is configured to generate and transmit a data message addressed to the enterprise communications system in response to a user request to call the remote party device, the data message comprising a telephone address for the remote party device.

16. The system claimed in claim 15, wherein the mobile device is configured to send said data message over a VoIP-capable IP connection with the enterprise communications system and wherein the enterprise communications system is configured to establish the first call leg as a VoIP call between the enterprise communication system and the mobile device over said IP connection.

17. The system claimed in claim 15, wherein a VoIP-capable IP connection is not present between the mobile device and the enterprise communications system, and wherein the enterprise communications system is configured to send an acknowledgement message to the mobile device in response to said data message, and wherein the mobile device is configured to automatically place a circuit-switched voice call to the enterprise communications system via the public land mobile network in response to the said acknowledgement message.

18. The system claimed in claim 12, wherein the PBX is configured to terminate the first call leg and the second call leg under the control of the enterprise voice application server and wherein the PBX includes a bridging agent for bridging the first call leg and the second call leg.

19. The system claimed in claim 12, wherein the enterprise voice application server includes a media processing component, and wherein the PBX and the enterprise voice application server are configured to establish one or more media paths between the PBX and the enterprise voice application server to terminate the first call leg and the second call leg at the media processing component of the enterprise voice application server, and wherein the enterprise voice application server includes a bridging agent for bridging the first call leg and the second call leg.

20. A mobile device having a phone number and associated with an enterprise, the enterprise including an enterprise communications system for managing enterprise-related calls, the mobile device comprising:

a communications subsystem for engaging in wireless communications with a public land mobile network;

a memory;

a processor for controlling the communications subsystem, and the memory; and instructions stored in the memory executable by the processor to instruct the public land mobile network, by sending a call forward command of the public land mobile network directly from the mobile device to the public land mobile network based on administrator-level privileges configured within the mobile device, to call forward a call request originally intended to the phone number of the mobile device to an enterprise phone number which terminates to an enterprise communications system, the enterprise phone number being associated with the mobile device, wherein the instructions include instructions to prevent a direct wireless voice call between the mobile device and a remote party device over the public land mobile network, and to prevent user-level alteration of configuration of the public land mobile network with regard to call forwarding a call request to the mobile device;

wherein the instructions include instructions to establish a first call leg between the mobile device and the enterprise communications system in response to a request to establish a call between the remote party device and the mobile device, and wherein the enterprise communications system is configured to receive a call request to the enterprise phone number, the call request being call-forwarded via the public land mobile network in execution of the call forward command of the public land mobile network and originating as a call request from the remote party device to the phone number of the mobile device, to establish a second call leg between the enterprise communications system and the remote party device and to bridge the first and second call legs at the enterprise communication system to connect the mobile device and the remote party device, completing the call from the remote party device to the mobile device, wherein the first and second call legs each include a voice call.

21. The mobile device claimed in claim 20, further comprising a WiFi subsystem for establishing a VoIP-capable IP connection with the enterprise communications system over a WLAN, and wherein the instructions include instructions to establish said first call leg as a VoIP call over said IP connection.

22. The mobile device claimed in claim 20, wherein the enterprise communications system is configured to send the mobile device a data message informing the mobile device of the call request from the remote party device, and wherein the-instructions include instructions to output a user alert through the user interface in response to the data message regarding the call request, receive a user input accepting the request through a user interface, and, in response to the user input, automatically place a circuit-switched voice call via the communications subsystem and the public land mobile network addressed to the enterprise communications system.

23. The mobile device claimed in claim 20, wherein the request comprises a request by the mobile device to establish the call with the remote party device, and wherein the instructions include instructions to generate and transmit a data message addressed to the enterprise communications system in response to a user request to call the remote party device, the data message comprising a telephone address for the remote party device.

24. The mobile device claimed in claim 23, wherein the enterprise communications system is configured to send an acknowledgement message to the mobile device in response to said data message, and wherein the instructions include instructions to automatically place a circuit-switched voice call to the enterprise communications system via the public land mobile network in response to the said acknowledgement message.

25. A non-transitory machine-readable medium having encoded thereon computer-executable instructions for routing a call between an enterprise-associated mobile device having a phone number and a remote party device through an enterprise communications system, the mobile device being configured for wireless communications over a public land mobile network, wherein the public land mobile network is directly instructed by the mobile device based on administrator-level privileges configured within the mobile device to call forward a call request originally intended to the phone number of the mobile device to an enterprise phone number using a call forward command of the public land mobile network, the enterprise phone number being associated with the mobile device, wherein the mobile device is configured to prevent user-level alteration of configuration of the public land mobile network with regard to call forwarding call requests addressed to the mobile device, the computer-executable instructions comprising:

instructions for receiving, at the enterprise communications system, a call request call-forwarded by the public land mobile network in execution of the call forward command of the public land mobile network and originating as a call request from the remote party device to the phone number of the mobile device;

instructions for
        establishing, at the enterprise communication system, a first call leg between the mobile device and the enterprise communications system,
        establishing, at the enterprise communication system, a second call leg between the enterprise communications system and the remote party device, and
        bridging, at the enterprise communication system, the first and second call legs to connect the mobile device and the remote party device, completing the call from the remote party device to the mobile device, wherein the first and second call legs each include a voice call.

\* \* \* \* \*